(No Model.)
G. F. HUTCHINS.
WARP BEAM FOR LOOMS.
No. 324,770. Patented Aug. 18, 1885.
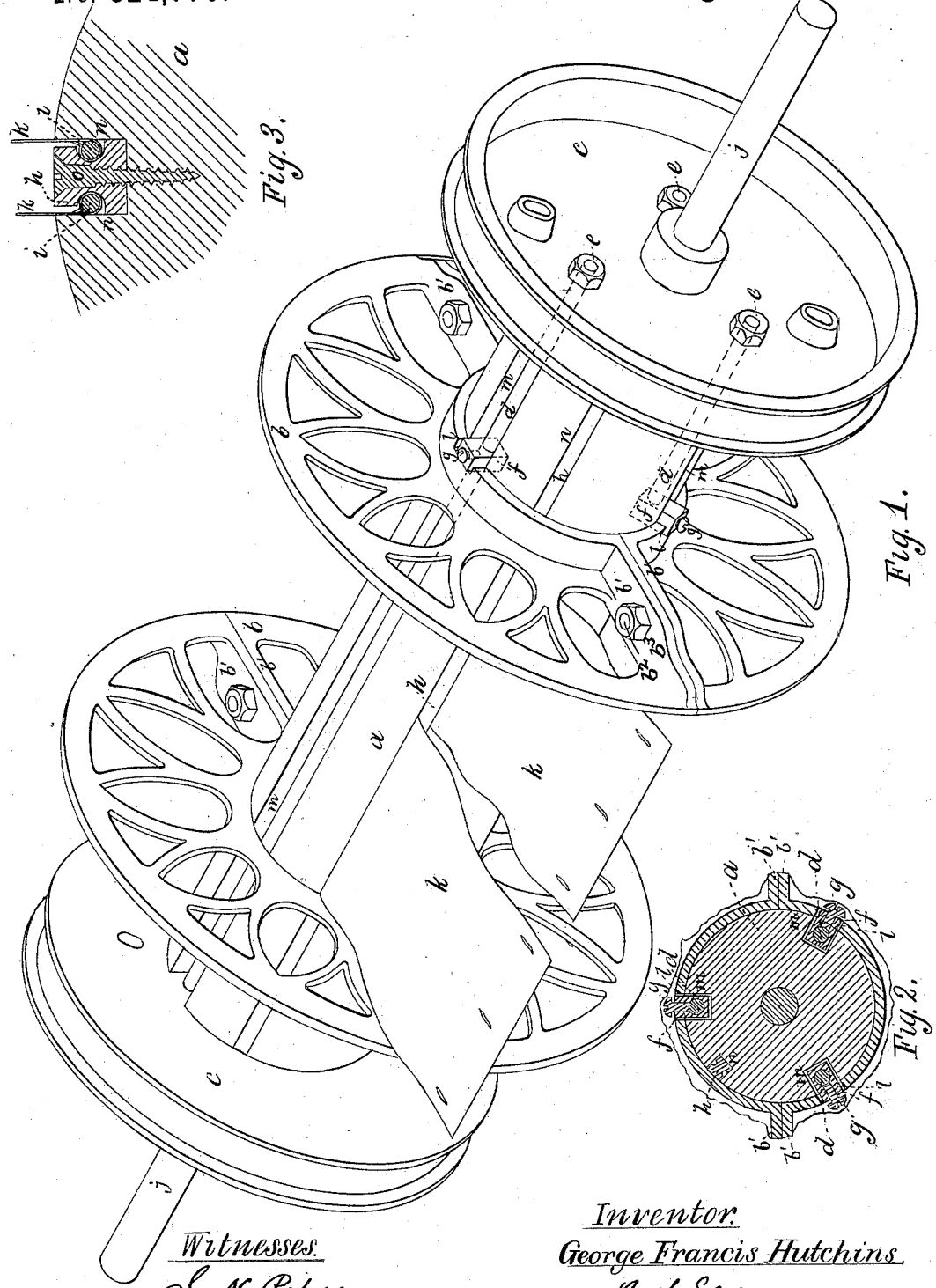
Witnesses
J. N. Piper.
C. B. Pratt.
Inventor
George Francis Hutchins
per R. H. Eddy
Attorney.

UNITED STATES PATENT OFFICE.

GEORGE FRANCIS HUTCHINS, OF WORCESTER, MASSACHUSETTS, ASSIGNOR TO L. J. KNOWLES & BROTHER, OF SAME PLACE.

WARP-BEAM FOR LOOMS.

SPECIFICATION forming part of Letters Patent No. 324,770, dated August 18, 1885.

Application filed October 15, 1884. (No model.)

*To all whom it may concern:*

Be it known that I, GEORGE FRANCIS HUTCHINS, of the city and county of Worcester, of the Commonwealth of Massachusetts, have invented a new and useful Improvement in Warp-Beams for Looms for Weaving; and I do hereby declare the same to be described in the following specification and represented in the accompanying drawings, of which—

Figure 1 is a perspective view, and Fig. 2 a transverse section, of a warp-beam provided with my invention, the nature of which is defined in the claims hereinafter presented. Fig. 3 is a transverse section, on an enlarged scale, of the upper portion of the warp-beam, such section being to exhibit the mechanism for connecting the aprons to the said beam.

My invention relates to a warp-beam provided with two sliding aprons and two heads so applied to it as to each be movable on it longitudinally of it, all of which I do not herein claim as my invention, which has reference to means or mechanism for supporting the heads and aprons.

In the said drawings, $a$ denotes the warp-beam body, it being, as usual, provided at each end of it with a journal, $j$, and a grooved pulley, $c$. Between the two pulleys there are to the beam, and concentric therewith, two circular heads, $b$, each of which is a wheel or disk consisting of two equal segments provided at their chords with flanges $b'$, the segments being held together by means of headed screws $b^2$ going through such flanges, and by nuts $b^3$, screwed on such screws, such method of making each head being to enable it to be easily applied to or removed from the beam, as occasion may require. The hub of the head is also formed by continuations of the flanges around the beam, as shown, each of such continuations having in it one or more rectangular notches, $l$, each of which is for reception of a slider, $f$, arranged on one of three rods, $d$, and provided with a set-screw, $g$, for clamping it to the rod. Each of these rods is placed within one of three grooves, $m$, made in the beam and opening out of it at its periphery, and having a width sufficient for the reception of the slider and to allow of it being moved along upon the rod in either direction of the length of the latter. Each rod at its ends is securely fastened to the beam or extends through the pulleys, and is held thereto by nuts screwed upon it, three of which are shown at $e$ in Fig. 1.

Each of the heads is movable on the beam longitudinally thereof, and is held in position thereon by certain of the sliders $f$ and their set-screws $g$, the notches in the hub of the head serving, with the said sliders, to prevent the head from being revolved on the beam independently thereof when a weaver may take hold of such head and turn it for the purpose of revolving the beam. The object of having the heads so movable on the beam is to adapt them to the width of warp to be wound upon the beam, the two aprons shown at $k$ being to aid in connecting the warp to the beam, such warp being suitably fastened to the two aprons, each of which is movable lengthwise of the beam and more or less across the other or fellow apron.

At its inner end each apron is hemmed to receive a wire or rod, $i$, arranged within the hem and extending across the apron. Furthermore, there is made in the beam, longitudinally of it, a groove, $n$, square or rectangular in transverse section. In this groove there is fitted or arranged, as shown in Fig. 3, a tongue, $h$, shaped very like a T-rail of a railway, the opposite sides of it being grooved or channeled to receive the two aprons and their wires or rods in the manner as represented in said Fig. 3. This tongue is fastened in the groove by screws going through the tongue and screwed into the beam, one of such screws being shown at $o$ in said Fig. 3.

From the above it will be seen how each apron can be moved lengthwise of the beam, so as to carry the outer edge of the apron up to the inner face of the next adjacent head $b$.

I claim—

1. The combination of the warp-beam body, grooved as described, and having pulleys $c$, with the heads recessed in their hubs, as described, a series of rods arranged longitudinally in the grooves and fixed at their ends to the beam or its pulleys, and with sliders adapted to slide on such rods and to enter the recesses of the heads, and having set-screws to clamp them to the said rods, all being substantially as set forth.

2. The beam-body grooved lengthwise on its periphery and having within the groove a T-shaped tongue, combined with the two aprons and the sustaining-rods of the said aprons, applied as described, such tongue being between the said two aprons, and they being extended outwardly from it and the beam-body and adapted to slide in the groove, substantially as represented.

GEORGE FRANCIS HUTCHINS.

Witnesses:
JOHN M. RUSSELL,
EDWARD F. GREEN.